United States Patent [19]

Gräff

[11] Patent Number: 4,918,837

[45] Date of Patent: Apr. 24, 1990

[54] DEVICE FOR GENERATING A CONTINUOUS STREAM OF DRIED GASES

[76] Inventor: Roderich W. Gräff, Engerländer Str. 2 - 4, 6108 Weiterstadt 2, Fed. Rep. of Germany

[21] Appl. No.: 703,213

[22] Filed: Feb. 15, 1985

[30] Foreign Application Priority Data

Feb. 15, 1984 [DE] Fed. Rep. of Germany ....... 3405260

[51] Int. Cl.⁵ .............................. F26B 21/06
[52] U.S. Cl. .............................. 34/80; 34/191; 55/33
[58] Field of Search ............ 34/80, 54, 191; 55/31, 55/33, 208

[56] References Cited

U.S. PATENT DOCUMENTS

| | | | |
|---|---|---|---|
| 3,972,129 | 8/1976 | Graff | 34/80 |
| 4,351,649 | 9/1982 | Owens et al. | 55/208 |
| 4,413,426 | 11/1983 | Graff | 34/80 |
| 4,419,835 | 12/1983 | Strain | 34/99 |
| 4,449,990 | 5/1984 | Tedford | 55/33 |
| 4,509,272 | 4/1985 | Graff | 34/80 |

Primary Examiner—Henry A. Bennet
Attorney, Agent, or Firm—Michael J. Striker

[57] ABSTRACT

A device for producing a continuous stream of dried gas supplied to a dryer for drying-up a particulate plastics material comprises a number of blowers and a number of adsorbent means-containing containers connected to heating arrangements which are inserted in the conduits leading to the drier. Each blower is immediately connected to an assigned adsorbent means-container and is switchable to operate for conveying dried-up gas and for regenerating adsorbent means in the container.

6 Claims, 2 Drawing Sheets

DEVICE FOR GENERATING A CONTINUOUS STREAM OF DRIED GASES

BACKGROUND OF THE INVENTION

The present invention relates to a device for generating a continuous stream of dried gas, preferably air, which is supplied to a storage container or hopper for the material to be dried.

The apparatus for generating a continuous stream of dried air obtained by adsorbing moisture from the air used for drying synthetic plastic granulate have been known. One of such apparatus has been disclosed in applicant's U.S. Pat. No. 3,972,129. In many drying methods, for example for drying synthetic plastic particulate material by means of dried air it is desired that dried air stream be continuously led through the material being dried. Therefore adsorption means-driers normally contain two blowers, namely a relatively large blower for blowing dried air and a small blower which has a capacity to handle about one third of the entire amount of the dried air and serves the purpose of conveying regeneration air. These two blowers are connected with the drying-means containers filled with the drying means or absorbent agents, and each adsorbent container alternatingly operates for adsorbing moisture from air whereas the second container at the same time regenerates air. The disadvantage of this drier resides in the fact that it includes a plurality of various electrical and mechanical individual parts, for example two blowers of different type with different electric control systems. This makes the whole process expensive and complicates the exchange of the parts in the apparatus. When one individual component of the drier is worn-out the whole drier stops running. Finally the drier of the conventional type always supplies a constant amount of dried air which can not be adjusted to the needs of the material to be dried.

SUMMARY OF THE INVENTION

It is an object of the present invention to provide an improved device for producing a continuous stream of dried air for a device for drying a material, such as synthetic plastic granulate.

It is another object of the present invention to provide a device for producing a continuous stream of dried gas, which is inexpensive in maintenance and which ensures the supply of the drying hopper with the amount of gas or air in accordance with the requirements.

These and other objects of the invention are attained by a device for the generation of a continuous stream of dried gas, preferably air, comprising a drying hopper; a plurality of containers containing a drying means therein; a plurality of conduits connected to said drying hopper and being at times switchable-off, each of said containers being connectable to said drying hopper via said conduits; and a plurality of blowers connectable to said conduits wherein the drying means of each container is intermittently passed through by a heated-up regeneration gas, each of said containers being directly coupled to an assigned blower.

In other words, each drying means-or absorbent-containing container is connected to an assigned blower immediately, or without any intermediate switching by any control valves, so that each blower is able to blow dry air as well as regeneration air through the connected container and both can be combined in a exchangeable structural group of the device.

It is advantageous that at each point in time, at which a respective container is connected to an assigned blower for regeneration, remaining containers with the blowers assigned thereto are switched to be connected to said drying hopper via the inlet and outlet conduit.

A switching-over from the air drying phase to the air regeneration phase can be obtained either through the use of valves provided for in the conduits or by changing the direction of rotation of the blowers.

Energy can be saved in particular when at least three of said containers with three of said blowers are provided in the device of the present invention. Inasmuch as the duration time of the regeneration for the adsorbent means is substantially shorter than the time period, during which air, passing through the absorbent agent, can dry up, for example that duration time is about one third of the time of the drying of air, the same number of the adsorbent means-containing vessels or chambers can be connected in a circuit with the material-containing drying hopper and only one adsorbent-means container is switched to the regeneration phase so that, on the one hand, a volume stream of the dried air to the drying hopper remains constant, and, on the other hand, available adsorbent or drying means can be used much better.

Each blower has a suction side; the device may further include a plurality of change-over valves and a regeneration gas source, each of said change-over valves being provided at the suction side of a respective blower and being connected to said drying hopper and to the regeneration gas source.

Each adsorbent means-container has an outlet side; and the device may include a plurality of additional change-over valves each provided at the outlet side of an assigned container; and a plurality of exhaust air conduits for moist regeneration air, each of said additional change-over valves being connected with said inlet conduit of said drying hopper and also with an assigned exhaust air conduit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
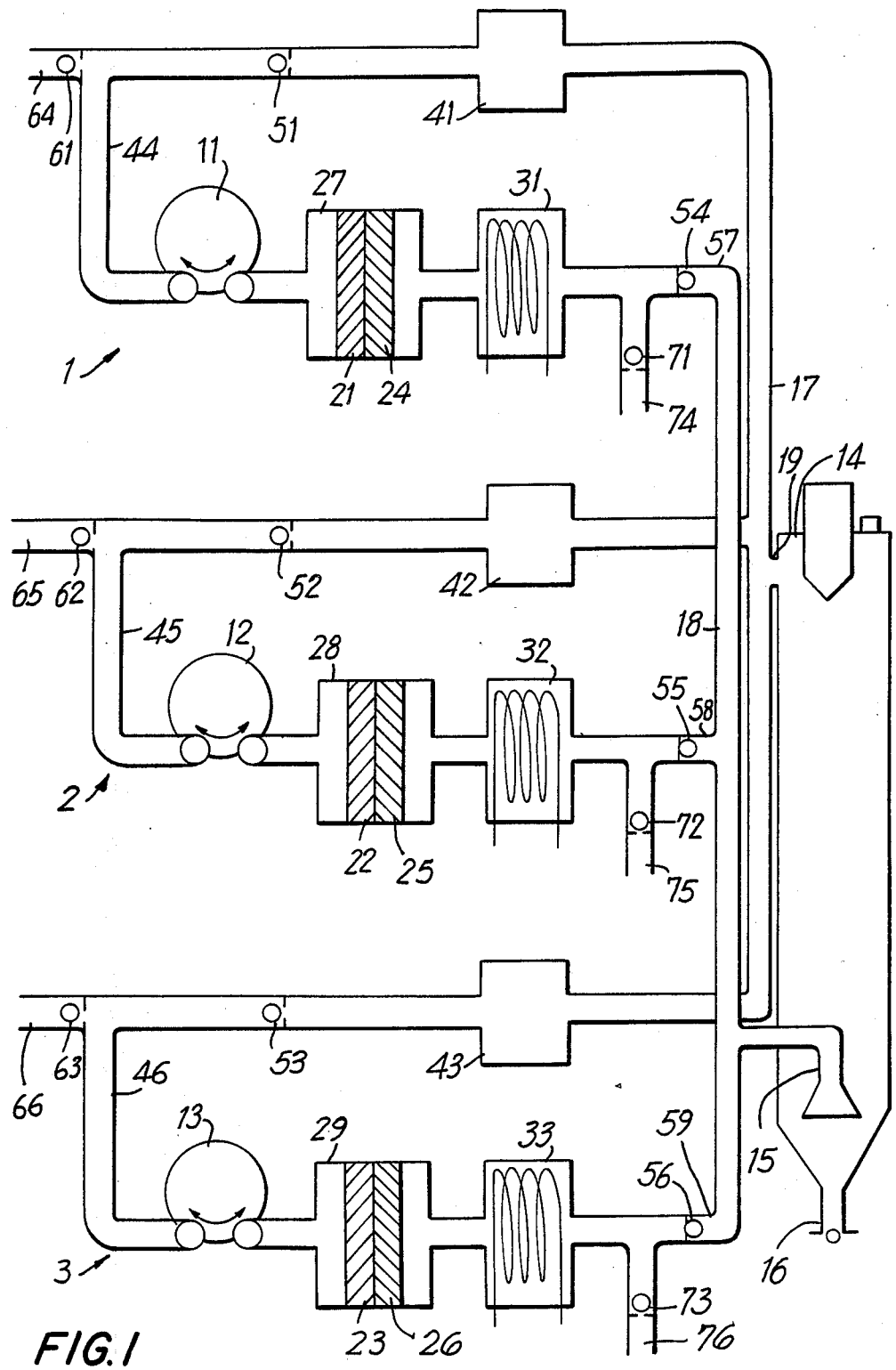
FIG. 1 is a diagrammatic view of a first embodiment of the apparatus according to the invention.

Referring now to the drawings in detail, and first to FIG. 1 thereof, it will be seen that the apparatus for generating a continuous stream of drying gases includes a drying hopper 14 which is filled with moist particulate plastics material. This material slowly flows downwardly during the drying process in the hopper towards an outlet end 16 of the hopper. An air supply conduit 15, through which air is conveyed to the hopper, is positioned in the lower portion of the hopper 14. Drying air flows through the particulate material in the direction opposite to the direction of sinking of the particulate material, e.g. upwardly and is discharged from the hopper through a discharge conduit connection 19 connected to the upper portion of the hopper. The discharge connection 19 is connected to a discharge conduit 17 which is branched off by three branch conduits. It is, of course, understood that any desired number of sections, other than three, of the discharge conduit 17 can be provided. Each branch conduit includes a filter 41, 42, 43 and a check valve 51, 52, 53, respectively, connected in series with the respective filter, and leads to a blower 11, 12, 13. Each blower is connected to a respective drying means-container 27, 28, 29 which is filled with a drying means 21, 24; 22, 25; 23, 26. The drying means may include a silika layer and a molecular sieve. Each drying means container may include an adsorption chamber accommodating two different adsorbents. Such adsorption container is conventional and is disclosed, for example, in applicant's U.S. Pat. No. 3,972,129. Each drying means-container is connected in series to a respective heating device 31, 32, 33. The latter are all connected via conduits 57, 58, 59, respectively, at the side facing away from container 27, 28, 29, to the air-feeding conduit 18. The air feeding conduit opens via the branch conduit 15 into the lower portion of hopper 14. Additional check valves 54, 55, 56 are provided in conduits 57, 58, 59, respectively.

Branch conduits 64, 65, 66 positioned between respective check valves 51, 52, 53 and blowers 11, 12, 13 and provided with further check valves 61, 62, 63, respectively, lead to the open air. Each conduit 52, 58, 99 also has a branch 74, 75, 76 positioned between the respective check valve 54, 55, 56 and the heating device 31, 32, 33 and leading also into the open air.

Each blower is combined with the respective heating device, filter and check valves into a structure group 1, 2, 3. Groups 1 and 3 are interchangeable with one another. These groups are releasably connectable to tubular conduits 16, 17 in non-shown but any suitable conventional fashion. Tubular conduits 17, 18 can have many branches to which a number of groups 1, 2, 3 could be connected. One of the structural groups can be omitted, then the drying output would be obtained in the remaining structural groups. The group, which is not to be used in the assembly, can be easily removed from the apparatus and replaced by another similar group. Finally, as many structural groups can be connected to hopper 14 via conduits 17, 18 as necessary to obtain a drying air outcome from the drying hopper 14.

During the drying phase, for example structural group 1 feeds air from the respective blower via conduit 44 to the drying means-container 27, whereby check valves 51 and 54 are open while check valves 51 and 71 are closed. During the air regeneration phase for the drying means 21, 24 the direction of rotation of blower 11 is switched over, so that this blower conveys air in the manner shown in the drawing from container 27 into conduit 44. When the air stream flows in the direction into conduit from container 27 check valves 51 and 54 are closed while check valves 71 and 61 are open. Thereby regeneration air sucked from the open air via branch conduit 74 and pre-heated in the heating device 31 drives moisture out from the drying means 21, 24 and then escapes via branch conduit 64 into the open air.

During the drying phase of the structural group 2 blower 12 runs in the counterclockwise direction so that check valves 52 and 55 are open while check valves 62 and 72 are closed. During the air regeneration phase of the operation of group 2 for the drying means 22, 25 the direction of rotation of the blower 12 is switched over, so that check valves 72 and 62 are open and check valves 52 and 55 are closed, whereby regeneration air sucked from the atmosphere through the conduit 72 and warmed-up in the heating device 32 flows through the drying means-container 28 and via branch conduit 65 escapes into the ambient atmosphere.

During the air drying phase of the structural group 3 check valves 53 and 56 are respectively open while check valves 63 and 73 are closed, whereas during the air regeneration phase of group 3 check valves 53 and 56, due to the change in the direction of rotation of blower 13, are closed while valves 73 and 63 are closed so that regeneration air is sucked into the system via branch conduit 76, heated up in the heating device 33, conveyed through the drying-means container 29 and discharged into the atmosphere via conduit 66.

Inasmuch as the regeneration phase is substantially shorter then the drying phase a non-shown but known central control device can be provided, for example to control group 1 in the direction of rotation of blower 11 to switch the latter to a regeneration stage and to switch, for example groups 2 and 3, by changing over the directions of rotation of blowers 12 and 13, to a drying stage for drying air sucked from hopper 14 via conduit 17. When the regeneration of the drying means 21, 24 of structural group 1 is shut off the control control device switches over the direction of rotation of blower 11 and, for example blower 12, so that air is sucked by the structural components of group 1 from the drying hopper 14 and dried up whereas the structural group 2 is switched to the regeneration phase and is separated from conduit 17 by the check valve 52. The drying hopper 14 receives the same volumes of drying air as before because yet two structural groups, namely groups 1 and 3, are switched to the drying stage. If the regeneration phase of the structural group 2 is shut off this group would be again switched to the drying process while group 3 would be switched to the regeneration process. The drying-up of exhaust air of the drying hopper 14 is again provided by two structural groups, namely by groups 1 and 2. It can be seen that in the exemplified embodiment two thirds of the entire quantity of the available drying means is used for drying. This ensures a better use of the drying means and a continuous availability of a constant volume of drying air.

Alternatively, the regeneration cycle of the drying means-container can only begin when even the adsorption capability of the drying means is worn out. This can take place, for example when, during the adsorption of water vapor from air the air discharged from the drying-means is controlled by a continual measurement of its dew point. As long as the gas to be dried is slightly loaded with water vapor this means that at times all three drying means-containers are in the ejeu of drying air, which positively affects the amount of dry air being generated Furthermore, energy required for the regeneration is saved because the drying means is regenerated only when its drying capability is used up.

Figure 2:
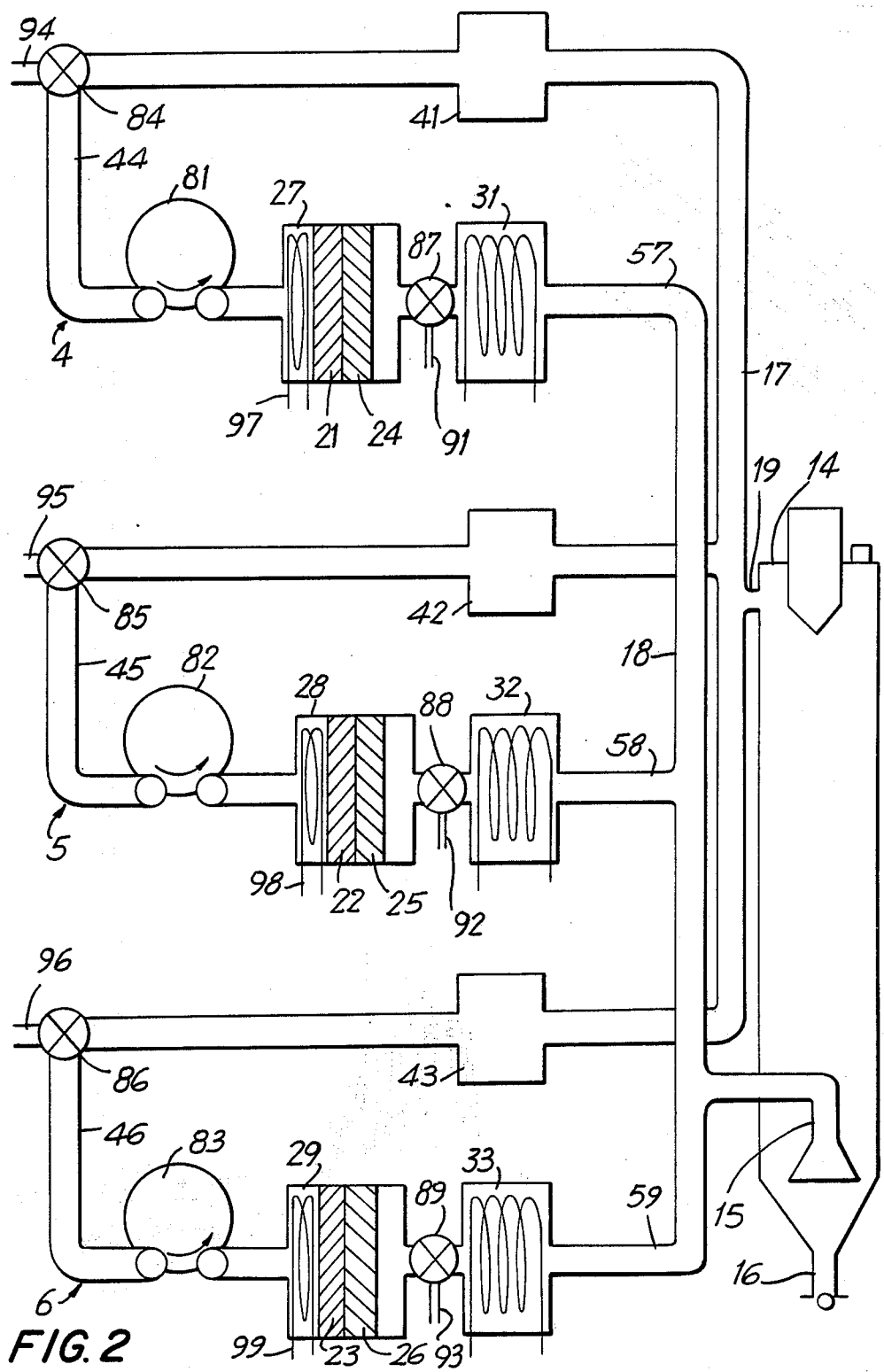
FIG. 2 is a diagrammatic view of a second embodiment of the apparatus of this invention.

FIG. 2 illustrates another embodiment of the invention, in which three structural groups 4, 5 and 6 are connected to the single drying hopper 14. The structural components of FIG. 2, similar to that of FIG. 1, are designated by the same reference numerals.

The substantial difference between the embodiment of FIG. 2 and that of FIG. 1 resides in that the blowers 81, 82 and 83 in each structural group 4, 5, 6 are not switchable-over in their direction of rotation and each of them is connected to the assigned drying means-container 27, 28, 29. The check valves of the embodiment of FIG. 1 are here omitted and the change-over valves as well as additional heating arrangements 97, 98, 99 are provided.

A change-over valve 84 in the structural group 4 is positioned in the suction conduit 44 for blower 81 and can connect, in accordance with its position, this blower either with the conduit exiting from filter 41 or with a suction conduit 94 for air regeneration. A change-over valve 87 is positioned in the conduit which connects the drying means-container 27 with the heating device 31 and can, in accordance with its position, connect container 27 either with the heating device 31 or with an exhaust air conduit 98 for moist regeneration air. A change-over valve 85 of the structural group 5 is respectively positioned in the suction conduit 45 for the blower 82 and can connect this blower either with the conduit leading from the filter 42 or with a suction conduit 95 of regeneration air. A change-over valve 86 is respectively positioned in the suction conduit 46 of the blower 83 of group 6. Valve 86 respectively connects conduit 46 either with the conduit extending from filter 43 or with a suction conduit 96 for regeneration air. A change-over valve 88 is positioned between the drying means-container 28 and the heating device 32. This valve can connect drying means-container 28 either with the heating device 32 or with a suction conduit 98 for moist regeneration air. A change-over valve 89 of group 6 is in turn located in the conduit which connects drying means-container 29 with the heating device 33 and can connect the container 29 either with the heating device 33 or with an exhaust air conduit 93 for moist regeneration air.

The drying phase and the regeneration phase will be described below only for the structural group 4 because this process in groups 5 and 6 is analogous to that of the structural group 4. During the drying phase of the structural group 4 the change-over valves 84 and 87 are connected such that blower 81 sucks moist air from the drying hopper 14, via filter 41 and suction conduit 44. Air is dried up in the drying means container 27 with the additional heating device 97 being shut off, and, after being warmed-up by the heating device 31 is conveyed via conduit 57 again into the drying hopper 14. For originating a regeneration phase the change-over valves 84 and 87 are switched over so that blower 81 sucks regeneration air from the suction connection 94 via the suction conduit 44. Air is then warmed-up in the additional heating device 97, which is switched on, and regenerates the container 27 which contains drying means 21 and 24. Then this is guided via change-over valve 87 and the exhaust air conduit 91 into the atmosphere.

The embodiment of FIG. 2 has the same advantages as the embodiment of FIG. 1.

It will be understood that each of the elements described above, or two or more together, may also find a useful application in other types of devices for generating a continuous stream of dried gases differing from the types described above.

While the invention has been illustrated and described as embodied in a device for generating a continuous stream of dried gases, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for the generation of a continuous stream of dried gas, preferably air, comprising a drying hopper containing a material to be dried; a plurality of containers containing adsorption means therein; a plurality of conduits connected to said drying hopper and being at times switchable-off, and a plurality of blowers; said blowers, said conduits and said containers being combined into a number of groups of equal size and including one of said blowers, one of said conduits and one of said conduits, said groups being interchangeable with each other and removable from the device and connectable immediately to said drying hopper via a respective conduit, each container in each of said groups being immediately coupled to an assigned blower, and wherein the adsorption means of each container is intermittently passed through by a heated-up regeneration gas.

2. The device as defined in claim 1, wherein said hopper is provided with an inlet conduit and an outlet conduit, and wherein at each point in time, at which a respective container of the group is connected to an assigned blower for regeneration, the containers with the blowers assigned thereto of other groups are switched to be connected to said drying hopper via said inlet and outlet conduit.

3. The device as defined in claim 2, wherein each of said blowers is rotatable, and wherein a direction of rotation of each blower is switchable-over.

4. The device as defined in claim 2, wherein at least three of said groups are provided.

5. The device as defined in claim 2, wherein each blower has a suction side; and further including a plurality of change-over valves and a regeneration gas source, each of said change-over valves being provided in each group at the suction side of a respective blower and being connected to said drying hopper and to the regeneration gas source of said group.

6. The device as defined in claim 5, wherein each container has an outlet side; and further including a plurality of additional change-over valves each provided in each group at the outlet side of an assigned container; and a plurality of exhaust air conduits for moist regeneration air each arranged in each group, each of said additional change-over valves being connected with said inlet conduit of said drying hopper and also with an assigned exhaust air conduit in a respective group.

* * * * *